United States Patent Office 3,803,146
Patented Apr. 9, 1974

3,803,146
INDENO[1,2,3-d,e]PHTHALAZINES
Ronald Ernest Rodway, Bourne End, and Robin George Simmonds, Wokingham, England, assignors to Aspro-Nicholas Limited, Slough, England
No Drawing. Filed Mar. 10, 1971, Ser. No. 123,061
Claims priority, application Great Britain, Mar. 14, 1970, 12,424/70
Int. Cl. C07d 51/06
U.S. Cl. 260—250 A        3 Claims

ABSTRACT OF THE DISCLOSURE

New indeno[1,2,3-d,e]phthalazines having a 3-amino substituent and which may also be substituted in one or both of the aromatic rings possessing useful pharmacological properties, which include anti-inflammatory activity and in particular antirheumatic activity. Pharmaceutical compositions of such compounds are also disclosed, along with the treatment of inflammation in animals.

This invention relates to indenophthalazines and in particular to 3-amino substituted-indeno[1,2,3-d,e]phthalazines and a method for their preparation. The present invention also provides pharmaceutical compositions containing said indenophthalazines and a method of antiinflammatory treatment comprising the administration of said indenophthalazines to an animal suffering from an inflammatory condition.

According to the present invention, there are provided certain novel indeno[1,2,3-d,e]phthalazines having the formula:

(I)

and acid addition salts and quaternary ammonium derivatives thereof wherein $R_1$ and $R_2$, which may be the same or different, represent hydrogen, hydroxy, halogen, cyano, nitro, amino, lower alkyl or lower alkoxy, and R represents a group selected from:

(i) —$NR_3R_4$ in which $R_3$ and $R_4$, which may be the same or different but not both hydrogen, represent hydrogen, alkyl, hydroxyalkyl, halogenoalkyl, substituted phenyl, phenylalkyl, or cycloalkyl or cycloalkyl-alkyl (the cycoalky moiety of which has from 3 to 8 carbons);

(ii)

$$-\left(\underset{|}{\overset{H}{N}}-A\right)_n -\!\!\left(\!\!\begin{array}{c}-N-\\\phantom{-}\\-B-\end{array}\!\!\right)$$

in which $n$ is zero or 1, A is a saturated or unsaturated aklene chain of 1 to 4 carbons, and B is a saturated or unsaturated alkylene chain of 4 to 6 carbons, one of which carbons may be replaced by an oxygen, nitrogen or sulphur atom; and (iii)

$$-\left(\underset{|}{\overset{H}{N}}-A\right)_n -\!\!N\!\!\left(\!\!\begin{array}{c}\phantom{x}\\\phantom{x}\end{array}\!\!\right)\!\!NR_5$$

in which A and $n$ are as defined above and $R_5$ represents alkyl, hydroxyalkyl, halogenoalkyl, alkoxyalkyl, acyl, acylalkyl, acyloxyalkyl, alkoxycarbonyl, alkoxycarbonylalkyl, phenyl, phenylcarbonyl, phenoxycarbonyl, phenylalkyl, phenylalkylcarbonyl or phenylalkoxycarbonyl.

Unless otherwise specifically stated, the term "alkyl" as used herein either explicitly or implicitly, for example in acyl (i.e. alkylcarbonyl), is intended to include straight and branched chain radicals, which may be saturated or unsaturated by one or more double or triple bonds, of up to 12 carbons, with the proviso that when more than one alkyl radical is present in a group, for example an alkoxyalkyl group, the total number of carbons in the several alkyl radicals does not exceed 12. The term "phenyl" as used herein includes unsubstituted and substituted phenyl whilst the term "substituted" as applied to phenyl means substituted by one or more lower alkyl, lower alkoxy or halogen groups.

The term "lower in qualifying various groups is used herein to mean that those groups contain from 1 to 6 carbons.

A particularly preferred group of compounds of Formula I are those in which $R_1$ and $R_2$, which may be the same or different, represent hydrogen, hydroxy, halogen, cyano, nitro, amino or alkyl or alkoxy of 1 to 4 carbons, and R represents a group selected from (i) —$NR_3R_4$ in which $R_3$ and $R_4$, which may the same or different but not both hydrogen, represent hydrogen, lower alkyl, hydroxy (lower) alkyl, halogeno (lower) alkyl, substituted phenyl, phenyl (lower) alkyl, or cycloalkyl or cycloalkyl (lower) alkyl (the cycloalkyl moiety of which has from 3 to 6 carbons);

(ii)

$$-\left(\underset{|}{\overset{H}{N}}-A\right)_n -\!\!\left(\!\!\begin{array}{c}-N-\\\phantom{-}\\-B-\end{array}\!\!\right)$$

wherein $n$ is zero or 1, A is a saturated akylene chain of 1 to 4 carbons, and B is a saturated or unsaturated alkylene chain of 4 or 5 carbons, one of which carbons may be replaced by an oxygen or nitrogen atom; and (iii)

$$-\left(\underset{|}{\overset{H}{N}}-A\right)_n -\!\!N\!\!\left(\!\!\begin{array}{c}\phantom{x}\\\phantom{x}\end{array}\!\!\right)\!\!NR_5$$

in which A and $n$ are as defined immediately above and $R_5$ represents lower alkyl, hydroxy (lower) alkyl, halogeno (lower) alkyl, lower acyl, lower acyloxy (lower) alkyl, lower alkoxycarbonyl, lower alkoxycarbonyl (lower) alkyl, phenyl, phenylcarbonyl, phenoxycarbonyl, phenyl (lower) alkyl, phenyl (lower) alkylcarbonyl or phenyl (lower) alkoxycarbonyl.

Within the afore-mentioned preferred group of compounds of Formula I, particularly valuable pharmacological properties are to be found in those compounds of Formula I in which $R_1$ and $R_2$, which may be the same or different, represent hydrogen, halogen, nitro, amino, methyl, ethyl, methoxy or ethoxy, and R represents a group selected from (i) —$NR_3R_4$ in which $R_3$ and $R_4$, which may be the same or different but not both hydrogen, represent hydrogen; methyl, ethyl, propyl, butyl, ethenyl, ethynyl, propenyl (especially allyl), propynyl (especially propargyl), methyl-, methoxy- or halogenophenyl, benzyl, methyl-, methoxy- or halogenobenzyl, cyclopropyl, cyclopropylmethyl, cyclobutyl, cyclobutylmethyl, cyclopentyl, cyclopentylmethyl, cyclohexyl, or cyclohexylmethyl;

(ii)

$$-\left(\underset{|}{\overset{H}{N}}-A\right)_n -\!\!\left(\!\!\begin{array}{c}-N-\\\phantom{-}\\-B-\end{array}\!\!\right)$$

in which n is 0 or 1, A is a methylene, ethylene, propylene or butylene chain, and

represents pyrrolyl, pyrrolidinyl, piperazinyl, oxazolidinyl, imidazolyl, imidazolidinyl, pyrazolyl, pyrazolidinyl, piperidinyl or morpholinyl; and (iii)

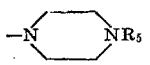

in which $R_5$ represents methyl, ethyl, propyl, butyl, ethenyl, ethynyl, propenyl (especially allyl), propynyl (especially propargyl), 2-chloroethyl, hydroxymethyl, 2-hydroxyethyl, acetyl, propionyl, acetoxymethyl, acetoxyethyl, propionyloxymethyl, methoxycarbonyl, ethoxycarbonyl, methoxycarbonyl-methyl or -ethyl, ethoxycarbonyl-methyl or ethyl, unsubstituted phenyl, unsubstituted phenylcarbonyl, unsubstituted phenoxycarbonyl, benzyl, benzylcarbonyl or benzyloxycarbonyl.

Where in this specification reference is made to a substituent without reference to its isomeric state, that reference is intended to include all the isomers of the substituent, e.g. reference to butyl includes n. butyl, isobutyl, s. butyl and t. butyl.

According to a feature of the present invention, there is provided a process for preparing the compounds of the present invention which comprises reacting a compound of the formula:

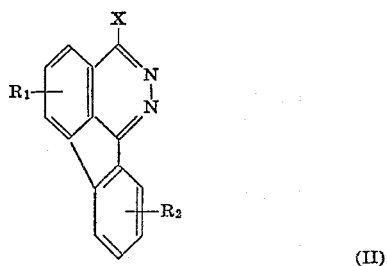

wherein $R_1$ and $R_2$ are as defined in Formula I, and X represents lower alkyl- or phenyl thio, -sulphinyl or -sulphonyl, or more advantageously, a halogen atom (particularly a chlorine atom), with a compound of the formul H—R, wherein R is as defined in Formula I, or with an acid addition salt of such a compound.

The reaction may be carried out in the presence or absence of a solvent and normally will be carried out at elevated temperatures.

When a solvent is used, the reaction is conveniently carried at the reflux temperature of the reaction mixture. Reaction times may vary from about 1 to 24 hours depending on the reaction conditions. When a solvent is used, suitable solvents include benzene, chloroform, toluene, acetone, dioxan, dimethylsulphoxide and the like.

If desired, a substituent on a compound prepared according to the foregoing process may be converted to another substituent falling within the defined substituents in Formula I. These conversions are carried out by methods well known per se. Thus, for example, a hydroxyalkyl substituent may be converted to a halogenoalkyl substituent by reaction with a halogenating agent such as thionylchloride or phosphorus tribromide in the presence or absence of an inert solvent, such as chloroform. An alkoxycarbonyl substituent may be converted to a hydrogen atom by the action of heat under basic conditions. A hydroxyalkyl substituent may be converted to an acyloxyalkyl substituent by action of a suitable acylating agent usually at elevated temperatures.

An unsubstituted imino group, for example in a piperazinyl group, may be alkylated or acylated using conventional means such as by reaction with an alkylating or acylating agent, for example an alkyl or acyl halide. Similarly the replacement of the imino hydrogen with an alkoxycarbonylalkyl group may be accomplished by reaction with an α-halogeno alkanoic ester.

The compounds of Formula II are either known compounds or may be readily prepared from known compounds by conventional procedures. Thus, for example, a nitro substituent may be introduced into either of the phenyl rings in Formula II by nitration. A nitro group may be converted to an amino group preferably by chemical reduction. An amino substituent may be diazotized and the resultant diazonium salt converted to a hydroxyl, halogen or cyano substituent in well-known manner. A hydroxyl or halogen substituent may then be converted respectively to an alkoxy or alkyl substituent using the usual procedures. The substituents $R_1$ and $R_2$ may also be introduced, or an existing substituent converted to another substituent, after the conversion of the Formula II intermediates to compounds of Formula I.

The compounds produced by the foregoing process may be isolated either per se or as acid addition salts or quaternary ammonium derivatives thereof.

The acid addition salts are preferably the pharmaceutically acceptable, non-toxic addition salts with suitable acids, such as those with inorganic acids, for example hydrochloric, hydrobromic, nitric, sulphuric or phosphoric acids, or with organic acids such as organic carbonxylic acids, for example glycollic, maleic, hydroxymaleic, malic, tartaric, citric, salicylic, o-acetyloxybenzoic, nicotinic or isonicotinic acd, or organic sulphonic acids for example methane sulphonic, ethane sulphonic, 2-hydroxyethane sulphonic, toluene-p-sulphonic or naphthalene-2-sulphonic acid. Apart from pharmaceutically acceptable acid addition salts, other salts are also included within the scope of acid addition salts such as, for example, those with picric or oxalic acid; they may serve as intermediates in the purification of the compounds or in the preparation of other, for example pharmaceutically acceptable, acid addition salts, or are useful for identification, characterization or purification of the bases.

A resulting acid addition salt may be converted into the free compound according to known methods, for example, by treating it with a base, such as with a metal hydroxide or alkoxide, for example an alkali metal or alkaline earth metal hydroxide, for example, lithium hydroxide, sodium hydroxide, potassium hydroxide or calcium hydroxide; with a metal carbonate, such as an alkali metal or an alkaline earth metal carbonate or hydrogen carbonate, for example sodium, potassium or calcium carbonate or hydrogen carbonate; with ammonia; or with a hydroxyl ion exchange preparation, or with any other suitable reagent.

A resulting acid addition salt may also be converted into another acid addition salt according to known methods; for example, a salt with an inorganic acid may be treated with a metal salt, for example a sodium, barium or silver salt, of an acid in a suitable diluent, in which a resulting inorganic salt is insoluble and is thus removed from the reaction medium. An acid addition salt may also be converted into another acid addition salt by treatment with an anion exchange preparation.

Quaternary ammonium derivatives of the compounds of this invention are particularly those formed by reaction with lower alkyl halides, for example, methyl, ethyl, or propyl chloride, bromide or iodide; di-lower alkyl sulphates, for example dimethyl or diethyl sulphate; lower alkyl lower alkane sulphonates, for example methyl or ethyl methane sulphonate or ethane sulphonate; lower alkyl aryl sulphonates, for example methyl or ethyl p-toluene sulphonates; and phenyl-lower alkyl halides, for example benzyl or phenethyl chloride, bromide or iodide. Also included are the quaternary ammonium hydroxides and the quaternary ammonium compounds having as anions those of other inorganic or organic acids, for example those of the acids used for the preparation of the previously mentioned acid addition salts.

The compounds of the present invention possess useful pharmacological properties. Such properties include anti-inflammatory activity and in particular anti-rheumatic activity. Certain of the compounds of Formula I also appear to produce an immunosuppressive effect in the animal body.

In the method aspect of the invention, there is provided a method of treating inflammation in animals comprising administering to said animals an amount effective to reduce inflammation of a phthalazine derivative as hereinbefore defined or an acid addition salt or quaternary ammonium derivative thereof.

In the composition aspect of the invention there are provided pharmaceutical formulations in which form the active compounds of the invention will normally be utilized. Such formulations are prepared in a manner well known in the pharmaceutical art and usually comprise at least one active compound of the invention in admixture or otherwise in association with a pharmaceutically acceptable carrier therefor. For making these formulations the active ingredient will usually be mixed with a carrier, or diluted by a carrier, or enclosed or encapsulated in a capsule, sachet, cachet, paper or other container. A carrier or diluent may be a solid, semi-solid or liquid material which serves as a vehicle, excipient or medium for the active ingredient. Some examples of such diluents or carriers are lactose, dextrose, sucrose, sorbitol, mannitol, starches, gum acacia, calcium phosphate, liquid paraffin, cocoa butter, oil of theobroma, alginates, tragacanth, gelatin, syrup B.P., methyl cellulose, polyoxyethylene sorbitan monolaurate, methyl- and propyl-hydroxybenzoate, talc, magnesium stearate or mineral oil.

The formulations of the invention may be adapted for enteral or parenteral use and may be administered to a subject requiring treatment, for example an animal suffering an inflammatory condition, in the form of tablets, capsules, suppositories, solutions, suspensions or the like. The dosage required for the treatment of any animal will usually fall within the range of about 0.01 to 250 mg./kg.

For example in the treatment of adult humans, each dosage of active ingredient will normally be from about 0.01 to 15 mg./kg., whereas in the treatment of test animals such as mice and rabbits a dosage of 10 to 200 mg./kg. may be used. The formulations of the invention may therefore be provided in dosage unit form, preferably each dosage unit containing from 1 to 1000 mg. more advantageously from 5 to 500 mg. and most preferably from 10 to 250 mg. of the active ingredient of the invention.

The following examples will further illustrate the preparation of the novel compounds of this invention.

EXAMPLE 1

3-chloro-indeno[1,2,3-d,e]phthalazine (8.8 g.) and 4-β-hydroxyethylpiperazine (11.0 g.) were dissolved in dry dioxan (75 ml.) and the solution heated under reflux for 3 hours. The solution was then poured into water (750 ml.) containing 2 N sodium hydroxide (18.5 ml.) and the resulting oil was extracted with chloroform. The chloroform layer was washed with water, extracted with 0.2 N hydrochloric acid, the acid extract washed with chloroform and basified with 2 N sodium hydroxide. The resulting oil was extracted with chloroform, washed with water, dried over magnesium sulphate and concentrated to give an oil which partly crystallized. This product was recrystallized from methanol to give 3-(4'-β-hydroxyethylpiperazin - 1' - yl)indeno[1,2,3-d,e]phthalazine (8.0 g.), M.P. 183–5° C.

EXAMPLE 2

A mixture of the compound of Example 1 (10 g.) and maleic acid (3.5 g.) was recrystallized from industrial methylated spirit to give bright yellow crystals of 3-(4'-β-hydroxyethylpiperazin - 1' - yl)indeno[1,2,3-d,e]phthalazine hydrogen maleate, M.P. 174–5° C.

EXAMPLE 3

A solution of 3 - chloro-indeno[1,2,3-d,e]phthalazine (10 g.) and N-ethoxycarbonylpiperazine (14.5 g.) in dry dioxan (50 ml.) was heated under reflux for 2½ hours. The reaction mixture was poured into water (2.3 litres) to give an oil which granulated. The crude product was filtered, washed with water, dried and crystallized from a small volume of methanol. Recrystallization from a large volume of petroleum ether (B.P. 100–20° C.) yielded 3-(4'-ethoxycarbonylpiperazin-1'-yl)indeno[1,2,3-d,e]phthalazine (6.7 g.), M.P. 175–6° C.

EXAMPLE 4

A mixture of 3-chloro-indeno[1,2,3-d,e]phthalazine (15 g.), anhydrous dimethylamine (100 ml.) in industrial methylated spirit (60 ml.) was stirred in an autoclave for 20 hours at 150° C. After evaporation of the solvent and excess dimethylamine, the residue was washed in water, filtered and dried to yield 3-dimethylamino-indeno[1,2,3-d,e]phthalazine, M.P. 144–6° C.

EXAMPLE 5

Using the method of Example 4 but with methylamine, 3-methylamino-indeno[1,2,3-d,e]phthalazine is obtained.

EXAMPLE 6

By the method of Example 1 but using ethanolamine, 3-(2'-hydroxyethylamino)indeno[1,2,3-d,e]phthalazine is obtained, M.P. 207–9° C.

EXAMPLE 7

By refluxing the compound of Example 6 with thionyl chloride, 3 - (2' - chloroethylamino)indeno[1,2,3-d,e]phthalazine hydrochloride is obtained.

EXAMPLE 8

By the method of Example 1 but using N-aminopropylmorpholine, 3 - [(3' - morpholinopropyl)amino]indeno-[1,2,3-d,e]phthalazine is obtained, M.P. 89–90° C.

EXAMPLE 9

By the method of Example 8 but using N-aminoethylmorpholine, 3 - [(2' - morpholinoethyl)amino]indeno-[1,2,3-d,e]phthalazine is obtained.

EXAMPLE 10

The compound of Example 3 (15 g.) was added to an aqueous alcoholic sodium hydroxide solution [NaOH (5.5 g.); water (5.5 ml.); alcohol (50 ml.)] and the mixture refluxed for two hours. After cooling, the mixture was acidified with dilute acetic acid, concentrated, treated with excess water, filtered and the filtrate basified. The precipitate was filtered off, washed with water and dried to yield 3-(piperazin-1'-yl)indeno[1,2,3-d,e]phthalazine, M.P. 186–7° C.

EXAMPLE 11

The product of Example 1 was refluxed in dry dioxan with acetyl chloride. The product was filtered after cooling, the solids dissolved in water and the solution basified. A precipitate of 3-[4-(2''-acetoxyethyl)piperazin-1'-yl]-indeno[1,2,3-d,e]phthalazine was obtained.

EXAMPLE 12

To the product of Example 10 in dry dimethylformamide containing powdered anhydrous potassium carbonate, was added allyl bromide and the mixture heated on a steam bath for 1½ hours. The solvent was partially removed under reduced pressure, the product treated with excess water and extracted with chloroform. The solvent was evaporated off and the residual solid recrystallized from light petroleum (B.P. 60–80° C.) to give 3-(4'- allylpiperazin-1'-yl)indeno[1,2,3 - d,e]phthalazine, M.P. 130–2° C.

EXAMPLE 13

Using the method of Example 12 but with propargyl bromide, 3-(4'-propargylpiperazin-1'-yl)indeno[1,2,3-d,e] phthalazine is obtained.

EXAMPLE 14

Using the method of Example 12 but with methyl chloroacetate, there is obtained methyl[4-(indeno[1,2,3-d,e] phthalazin-3'-yl)piperazin-1-yl]acetate.

EXAMPLE 15

By the method of Example 1 but using 4-acetylmethylpiperazine, there is obtained 3-(4'-acetylmethylpiperazin-1'-yl)indeno[1,2,3-d,e]phthalazine.

EXAMPLE 16

By the method of Example 1 but using 4-β-ethoxyethylpiperazine, there is obtained 3-(4'-β-ethoxyethylpiperazin-1'-yl)indeno[1,2,3-d,e]phthalazine.

EXAMPLE 17

By the method of Example 1 but using 4-t.butylpiperazine, there is obtained 3 - (4' - t.butylpiperazin-1'-yl) indeno[1,2,3-d,e]phthalazine.

EXAMPLE 18

By refluxing the compound of Example 1 with thionyl chloride, there is obtained 3-(4'-β-chloroethylpiperazin-1'-yl)indeno[1,2,3-d,e]phthalazine hydrochloride.

EXAMPLE 19

By the method of Example 1 but using cyclohexylmethylamine, there is obtained 3-cyclohexylmethylamino-indeno[1,2,3-d,e]phthalazine.

EXAMPLE 20

By the method of Example 1 but using cyclopropylamine, there is obtained 3 - cyclopropylamino - indeno-[1,2,3-d,e]phthalazine.

EXAMPLE 21

By the method of Example 1 but using N-methyl-N-propargylamine, there is obtained 3-(N-methyl-N-propargylamino)indeno[1,2,3-d,e]phthalazine.

EXAMPLE 22

By the method of Example 1 but using pyrrolidine, pyrrole, imidazole, pyrazole, pyrazolidine, or piperidine, there are obtained respectively 3-(pyrrolidin-1'-yl)indeno[1,2,3-d,e]phthalazine
3-(pyrrol-1'-yl)indeno[1,2,3-d,e]phthalazine
3-(imidazol-1'-yl)indeno[1,2,3-d,e]phthalazine
3-(pyrazol-1'-yl)indeno[1,2,3-d,e]phthalazine
3-(pyrazolidin-1'-yl)indeno[1,2,3-d,e]phthalazine
3-(piperidin-1'-yl)indeno[1,2,3-d,e]phthalazine.

EXAMPLE 23

By the method of Example 1 but using 3-chloro-9-nitro-indeno[1,2,3-d,e]phthalazine, there is obtained 3-(4'-β-hydroxyethylpiperazin-1'-yl) - 9 - nitroindeno[1,2,3-d,e] phthalazine.

EXAMPLE 24

By the method of Example 1 but using 3,9-dichloro-indeno[1,2,3-d,e]phthalazine, there is obtained 3-(4'-β-hydroxyethylpiperazin-1'-yl) - 9 - chloroindeno[1,2,3-d,e] phthalazine.

EXAMPLE 25

By the method of Example 1 but using 3-chloro-4,9-dinitro[1,2,3-d,e]phthalazine, there is obtained 3-(4'-β- hydroxyethylpiperazin-1'-yl) - 4,9 - dinitroindeno[1,2,3-d,e]phthalazine.

EXAMPLE 26

By the method of Example 6 but using propanolamine, 3 - (3' - hydroxypropylamino)indeno[1,2,3-d,e]phthalazine, M.P. 171–2° C., is obtained.

EXAMPLE 27

To a solution of anhydrous piperazine (17.2 g.) in dry dioxan (150 ml.) was added 3-chloro-indeno[1,2,3-d,e] phthalazine (12 g.) and the mixture stirred and heated under reflux for 2 hours. The cooled product was poured into excess water (ca. 1 litre) and extracted with chloroform. The chloroform was evaporated under reduced pressure and the residual crude amine was recrystallized from toluene to provide long needles of 3-(piperazin-1'-yl)indeno[1,2,3-d,e]phthalazine, M.P. 186–7° C. (i.e. identical with that obtained by the process of Example 10).

EXAMPLE 28

To a solution of the compound of Example 27 (1.4 g.) in methanol (7 ml.) was added with stirring a solution of maleic acid (0.6 g.) in methanol (5 ml.). After 10 minutes the precipitate was filtered off, and the crude salt recrystallized from methanol to give blades of 3-(piperazin-1'-yl)indeno[1,2,3-d,e]phthalazine hydrogen maleate, M.P. 205–7° C.

EXAMPLE 29

To a suspension of the product of Example 10 in dry dioxan (120 ml.) was added acetic anhydride (4.4 ml.) and the mixture was stirred and heated on the steam bath for 1 hour. The solution was cooled, the crystalline product filtered off and treated with water and dilute ammonium hydroxide solution. The product was filtered off, dried and recrystallized from ethyl acetate to give yellow needles of 3 - (4' - acetylpiperazin-1'-yl)indeno[1,2,3-d,e] phthalazine, M.P. 219–220° C.

EXAMPLE 30

3-chloro-indeno[1,2,3-d,e]phthalazine (23.85 g.) was heated under reflux with ethanolamine (13.0 g.) in dry dioxan (100 ml.) for 4 hours. The reaction mixture was then cooled and evaporated under reduced pressure. The residue was treated with water (500 ml.) and chloroform (500 ml.) and stirred for 30 minutes. The solid formed was collected, washed and dried (crude yield 24.5 g.). Crystallization from ethanol (1 litre) after treatment with activated charcoal gave light brown crystals of 3-(2'-hydroxyethylamino)indeno[1,2,3 - d,e]phthalazine, M.P. 207–9° C. Yield is 13.2 g. (50% theory). A further crop (M.P. 203–6° C., 5.1 g.) was obtained by evaporating the mother liquors to 100 ml.

EXAMPLE 31

A solution of 3-chloro-indeno[1,2,3-d,e]phthalazine (12 g.) and N-(3-aminopropyl)morpholine (16 g.) in dry dioxan (100 ml.) was heated under reflux for 4 hours. The reaction mixture was then cooled and poured into 2 litres of water containing 25 ml. 2 N NaOH. The resulting brown oil was extracted with 500 ml. chloroform. The chloroform extract was washed twice with water and then extracted with 500 ml. 0.1 N hydrochloric acid. This acidic extract, after being washed twice with chloroform, was basified with 2 N NaOH (26 ml.) and then re-extracted with 500 ml. chloroform. The chloroform extract was washed twice with water, dried over anhydrous magnesium sulphate, and concentrated to a brown oil, which crystallized. Recrystallization from a small volume of methanol gave a product which analyzed for 1 molecule of methanol of crystallization. It was dissolved in methanol (50 ml.) and poured with stirring into water (500 ml.). The resulting yellow precipitate was filtered and dried in a vacuum oven at 40° C. Yield 7.5 g. (44% theory) of 3 - (3' - morpholinopropylamino)indeno[1,2,3-d,e]phthalazine, M.P. 89–90° C.

EXAMPLE 32

To 3-(piperazin-1'-yl)inden[1,2,3-d,e]phthalazine (14.4 g.), obtained as in Example 10, in dry dimethyl formamide (400 ml.) was added anhydrous potassium carbonate (7 g.). To this mechanically stirred mixture was then added dropwise allyl bromide (6.05 g., freshly distilled) and the resultant yellow-orange solution was heated on an oil-bath at about 100° C. with stirring for a further 2 hours. The solvent was then partially removed by distillation under reduced pressure and the concentrate poured into excess water (about 400 ml.). After extraction three times with chloroform, the combined extracts were washed with water, dried over MgSO$_4$, and reduced to a small volume (about 40 ml.) by evaporation. Addition of light petroleum B.P. 40–60° C.; about 300 ml.) provided a yellow granular solid, M.P. 129–132° C. (12.9 g.).

Recrystallization of a portion (0.5 g.) from light petroleum (B.P. 60–80° C.; about 150 ml.) gave yellow needles of anhydrous 3 - (4'-allylpiperazin-1'-yl)indeno [1,2,3-d,e]phthalazine, M.P. 136–8° C.

Recrystallization of another portion (7 g.) from dilute aqueous ethanol (about 60 ml.) gave yellow needles of the moonhydrate, melting at 57–58° C., solidifying, and then remelting at 136–8° C.

EXAMPLE 33

3 - chloro - indeno[1,2,3-d,e]phthalazine (11.4 g.) and cyclopropylamine (9 ml.) in dry dioxan (150 ml.) were heated in an autoclave at 150° C. for 15 hours. The reaction mixture was then poured, with stirring, into 3 litres of water containing 25 ml. 2 N NaOH. The resultant oil was extracted with chloroform, the chloroform layer washed well with water, and the product extracted with dilute aqueous hydrochloric acid. The aqueous extract was basified with dilute aqueous sodium hydroxide solution, and the product then re-extracted with chloroform. This extract was washed with water, dried, and concentrated. The resulting crude product was then recrystallized from benzene (about 200 ml.). Yield 5.9 g. (47.7%), M.P. 199–202° C.

EXAMPLE 34

7-bromo-fluorenone-1-carboxylic acid (30 g.; J. Chem. Soc., 1950, 2784) and hydrazine hydrate (10 ml.) in ethanol (200 ml.) were heated under reflux for 4 hours. The reaction mixture was then poured into water (3 litres) and the product which precipitated was filtered out, washed with water and dried. The crude product was extracted with 2-ethoxyethanol (1500 ml.) in a Soxhlet apparatus for 24 hours to yield 19.2 g. (64.2% theory) of crystalline 9-bromo-indeno[1,2,3-d,e]phthalazine.

A mixture of this product (7.5 g.) with phosphorus oxychloride (100 ml.) was heated under reflux for 2 hours. The reaction mixture was then concentrated under reduced pressure, and the residue suspended in chloroform (1500 ml.) and poured into an ice/ammonia mixture. The chloroform layer was then separated, washed with water, dried and concentrated, to yield 6.6 g. (82.5% theory) of 9 - bromo - 3-chloro-indeno[1,2,3-d,e]phthalazine.

A solution of this product (6.6 g.) and 4-β-hydroxyethylpiperazine (6.0 g.) in dry dioxan (50 ml.) was heated under reflux for 2 hours. The reaction mixture was then poured into water (1 litre) containing 10.4 ml. of 2 N NaOH. The product which precipitated was filtered out, washed with water, dried and recrystallized from benzene to give 5.5 g. (65% theory) of 9-bromo-3-(4'-β-hydroxyethylpiperazin - 1' - yl)indeno[1,2,3-d,e]phthalazine, M.P. 177–8° C.

EXAMPLE 35

3-chloro-indeno[1,2,3-d,e]phthalazine (23.85 g.) and 3-propanolamine (15 g.) in dry dioxan (100 ml.) were refluxed for 4 hours. The reaction mixture was then evaporated under reduced pressure and the residue stirred with water (500 ml.) and cholroform (500 ml.). The solid material formed was filtered out, washed, and dried, crude yield 25.2 g. The product was then recrystallized from ethanol (150 ml.) after treatment with activated charcoal to yield 16.0 g. (58% theory) of light brown crystals of 3-(3'-hydroxypropyl amino)indeno[1,2,3-d,e]phthalazine, M.P. 171–2° C.

EXAMPLE 36

The crystallized base from Example 35 (13.5 g.) was dissolved in hot ethanol (350 ml.) and the hot solution treated, with stirring, with gaseous hydrogen chloride. A yellow precipitate was formed immediately. After 30 minutes the passage of gas was stopped and the mixture cooled. The precipitate was filtered out, washed thoroughly with ethanol, and dried, to give a quantitative yield of 3-(3'-hydroxypropylamino)indeno[1,2,3,-d,e]phthalazine hydrochloride, M.P. 272–4° C.

EXAMPLE 37

A solution of chromium trioxide (19 g.) in water (16 ml.) and acetic acid (11 ml.) was added slowly to a suspension in acetic acid (150 ml.) at 115° C. of 2-chlorofluoranthene (6.4 g.; Canad. J. Chem., 45 (1967), 96). When the addition was complete the reaction mixture was heated under reflux for 1 hour, then cooled and poured into water (800 ml.). The resulting precipitate was filtered out, washed well with water, and extracted with 0.5 N NaOH (60 ml.). The extract was filtered and then reacidified. The resulting precipitate was filtered out, washed with water, dried, and recrystallized from 2-ethoxyethanol (10 ml.) to give 3-chlorofluorenone-1-carboxylic acid in a yield of 1.4 g.

A mixture of this keto acid (1.3 g.) and hydrazine hydrate (0.6 ml.) in 2-ethoxyethanol (15 ml.) was heated under reflux for 4 hours, during which time a precipitate formed. The reaction mixture was then cooled and the precipitate filtered out, washed with ether and dried, to give a yield of 0.9 g. (69% theory) of 5-chloro-indeno [1,2,3-d,e]phthalazone.

A mixture of this phthalazone (0.9 g.) and phosphorus oxychloride (5 ml.) was heated under reflux for 2 hours. The reaction mixture was then, after cooling, concentrated under reduced pressure, taken up in chloroform, and poured into an ice/concentrated ammonia mixture. The chloroform layer was separated, washed with water, dried, and concentrated to give 1.0 g. of 3,5-dichloro-indeno[1,2,3-d,e]phthalazine.

A solution of this dichloro compound (1.0 g.) and N-(β-hydroxyethyl)piperazine (1.1 g.) in dry dioxan (10 ml.) was heated under reflux for 4 hours. The reaction mixture was then poured into water (200 ml.) containing 1.85 ml. 2 N NaOH, and the resulting oil then extracted with chloroform. The chloroform extract was washed with water and then extracted with 0.1 N HCl (40 ml.). The acid extract was washed with chloroform, basified with 2 N NaOH (2.5 ml.) and extracted with chloroform. The chloroform extract was washed with water, dried, and concentrated to a yellow oil which crystallized, and was recrystallized from ethanol (10 ml.) to give 0.3 g. of 5-chloro-3-(4'-β-hydroxyethylpiperazin-1'-yl)indeno[1,2,3-d,e]phthalazine, M.P. 155–5° C.

In the following examples of pharmaceutical preparations, the term "medicament" is used to indicate the compound 3-(4'-β-hydroxyethylpiperazin-1'-yl)indeno[1,2,3-d,e]phthalazine hydrogen maleate. That compound may of course be replaced by any other active compound of this invention and the amount of medicament may be

EXAMPLE 37

Tablet formulation

| | Mg./tablet |
|---|---|
| Medicament | 15 |
| Lactose | 86 |
| Maize starch (dried) | 45.5 |
| Gelatin | 2.5 |
| Magnesium stearate | 1.0 |

The medicament was powdered and passed through a B.S. (British Standard) No. 100 sieve and well mixed with the lactose and 30 mg. of the maize starch, both passed through a B.S. No. 44 sieve.

The mixed powders were massed with a warm gelatin solution prepared by stirring the gelatin in water and heating to form a 10% w./w. solution. The mass was granulated by passing through a B.S. No. 12 sieve and the moist granules dried at 40° C.

The dried granules were re-granulated by passing through a B.S. No. 14 sieve and the balance of the starch sieved 44 mesh and the magnesium stearate sieved 60 mesh were added and thoroughly mixed.

The granules were compressed to produce tablets each weighing 150 mg.

EXAMPLE 38

Tablet formulation

| | Mg./tablet |
|---|---|
| Medicament | 100 |
| Lactose | 39 |
| Maize starch (dried) | 80 |
| Gelatin | 4.0 |
| Magnesium stearate | 2.0 |

The method of preparation is identical with that of Example 37 except that 60 mg. of starch is used in the granulation process and 20 mg. during tabletting.

EXAMPLE 39

Capsule formulation

| | Mg./capsule |
|---|---|
| Medicament | 250 |
| Lactose | 150 |

The medicament and lactose were passed through a No. 44 B.S. sieve and the powders well mixed together before filling into hard gelatin capsules of suitable size, so that each capsule contained 400 mg. of mixed powders.

EXAMPLE 40

Suppositories

| | Mg./suppository |
|---|---|
| Medicament | 50 |
| Oil of Theobroma | 950 |

The medicament was powdered and passed through a B.S. No. 100 sieve and triturated with molten oil of Theobroma at 45° C. to form a smooth suspension.

The mixture was well stirred and poured into moulds, each of nominal 1 g. capacity, to produce suppositories.

EXAMPLE 41

Cachets

| | Mg./cachet |
|---|---|
| Medicament | 100 |
| Lactose | 400 |

The medicament was passed through a B.S. No. 40 mesh sieve, mixed with lactose previously sieved 44 mesh and filled into cachets of suitable size so that each contained 500 mg.

EXAMPLE 42

Intramuscular injection (suspension in aqueous vehicle)

| | Mg. |
|---|---|
| Medicament | 10 |
| Sodium citrate | 5.7 |
| Sodium carboxymethylcellulose (low viscosity grade) | 2.0 |
| Methyl para-hydroxybenzoate | 1.5 |
| Propyl para-hydroxybenzoate | 0.2 |
| Water for injection to 1.0 ml. | |

The sodium citrate and sodium carboxymethylcellulose were mixed with sufficient water for injection at 80° C. The mixture was cooled to 50° C. and the methyl and propyl para-hydroxybenzoates added followed by the medicament previously milled and sieved 300 mesh. When cooled the injection was made up to volume and sterilized by heating in an autoclave.

EXAMPLE 43

Rats with a hind paw inflamed with carrageenin-induced oedema were dosed orally by the method of Winter, Risley, and Nuss (Proc. Soc. Exp. Biol., New York, 1962, 111, 544–547) with a 5 ml. dose of an aqueous gum tragacanth suspension of 3 - dimethylamino-indeno[1,2,3-d,e]phthalazine. Various dose levels were employed with a view to evaluating the dosage required to give an anti-inflammatory response equivalent to that given by an oral dose of aspirin at the rate of 64 mg. per kilogram live weight. The oral dose level equivalent to this level of aspirin dosage was found to be 24 mg./kg., i.e. an actual dose of 4 mg. to 5 mg. in 5 ml. of gum tragacanth solution, depending upon the body weight of the rat.

Having regard to the foregoing disclosure, the following is claimed as the inventive and patentable embodiments thereof:

1. Indeno[1,2,3-d,e]phthalazines of the formula:

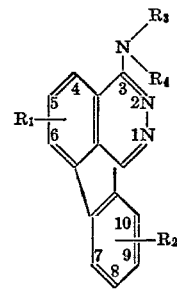

and acid addition salts and quaternary ammonium derivatives thereof, wherein:

$R_1$ is selected from the group consisting of hydrogen, hydroxy, halogen, cyano, nitro, amno, alkyl having from one to six carbon atoms, and alkoxy having from one to six carbon atoms;

$R_2$ is selected from the group consisting of hydrogen, hydroxy, halogen, cyano, nitro, amino, alkyl having from one to six carbon atoms;

$R_3$ is selected from the group consisting of alkyl, hydroxyalkyl and halogenoalkyl, the alkyl having from one to twelve carbon atoms; and $R_4$ is selected from the group consisting of hydrogen, alkyl, hydroxyalkyl and halogenoalkyl, the alkyl having from one to twelve carbon atoms.

2. Indeno[1,2,3-d,e]phthalazines in accordance with claim 1 wherein both $R_1$ and $R_2$ are hydrogen.

3. Indeno[1,2,3-d,e]phthalazines in accordance with claim 1 wherein $R_3$ and $R_4$ are each methyl.

References Cited

Chemical Abstracts, vol. 64, pp. 3525–3526 (1966).

NICHOLAS S. RIZZO, Primary Examiner

U.S. Cl. X.R.

424—250